Patented June 18, 1940

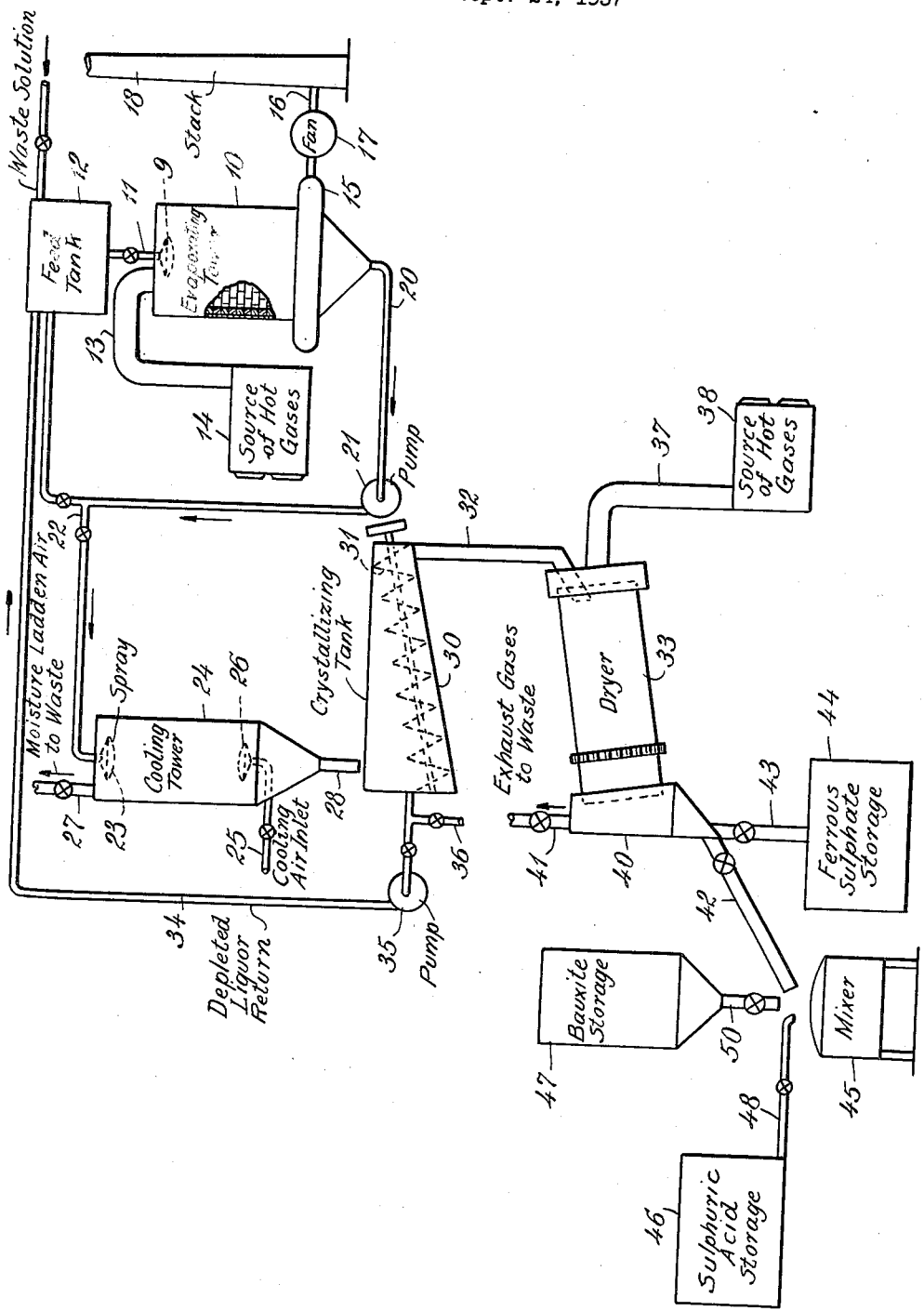

2,204,777

UNITED STATES PATENT OFFICE 2,204,777

APPARATUS FOR THE RECOVERY OF SALTS FROM AQUEOUS SOLUTIONS

Elias Anthon Cappelen Smith, New York, N. Y., assignor to Guggenheim Brothers, New York, N. Y., a copartnership Application September 24, 1937, Serial No. 165,462

2 Claims. (Cl. 23—260)

This invention relates to the treatment of solutions and has for an object the provision of improved apparatus for recovering valuable components dissolved therein. More particularly, the invention contemplates the provision of improved apparatus for treating waste liquors such, for example, as waste pickling liquor and waste liquor produced in the manufacture of paint pigments. A further object of the invention is to provide improved apparatus for utilizing waste liquors in the production of salts such as ferrous sulphate, ferric sulphate and ferric aluminum sulphate. The invention further contemplates the provision of improved apparatus for use in carrying out the method or process of my invention described in my copending application Serial No. 1,646, filed January 14, 1935, of which this application is a continuation-in-part.

Waste liquors from many sources contain in solution chemical reagents which have valuable industrial applications, but which are wasted because no commercially feasible processes for their recovery are available. For example, impoverished pickling liquors resulting from the treatment of steel contain considerable quantities of iron sulphate and some free sulphuric acid, a representative sample of such liquors containing about 50 grams per liter of iron combined as ferrous sulphate and about 20 grams per liter of free sulphuric acid all in aqueous solution. Disposal of large quantities of such liquors is a serious problem and a source of considerable expense and inconvenience to the manufacturer and, in some instances, considerable annoyance to the public.

The ferrous sulphate contained in waste pickling liquors, if recoverable, can be employed advantageously in many industries. For example, ferrous sulphate can be employed advantageously, either directly or after conversion to ferric sulphate, in water purification processes and in sewage treatment processes of the chemical precipitation type. The development of chemical precipitation processes of sewage treatment has been retarded to some extent by the relatively high cost of chemical reagents.

I propose to treat waste liquors such as picklink liquors in order to accomplish (1) some measure of conservation of natural resources by recovering in usable form one or more components of the liquors which might otherwise be wasted; (2) the elimination of expense and annoyance resulting from disposal of such liquors according to some heretofore customary practices; and (3) the advancement of municipal sanitation through the provision of a relatively cheap source of reagents for use in sewage treatment processes of the chemical precipitation type and for use in water purification processes.

A method or process of my invention, as described in my aforementioned copending application, involves the treatment of liquor containing ferrous sulphate in aqueous solution to produce ferrous sulphate mono-hydrate. The liquor may be treated to effect the precipitation of ferrous sulphate mono-hydrate directly therefrom, or the liquor may be treated to effect the precipitation of copperas, and the copperas (heptahydrate—$FeSO_4.7H_2O$) may be treated to produce ferrous sulphate mono-hydrate. When ferrous sulphate mono-hydrate is produced directly by precipitation from the liquor, the liquor may be concentrated at a temperature below the minimum temperature at which ferrous sulphate mono-hydrate will be precipitated effectively, and the temperature of the concentrated liquor may be raised to effect the precipitation of ferrous sulphate mono-hydrate; or the liquor may be heated to a temperature above the minimum temperature at which ferrous sulphate mono-hydrate will precipitate effectively to effect concentration of the liquor and precipitation of ferrous sulphate mono-hydrate as the liquor becomes sufficiently concentrated.

The liquor may be concentrated to any suitable degree by the elimination of water prior to the commencement of the precipitating stage through variation of the temperature. In producing ferrous sulphate mono-hydrate by precipitation, I prefer to concentrate the liquor at a temperature below 70° C. to a point at which ferrous sulphate will precipitate when the liquor is heated to a temperature above 70° C. and then heat the liquor to a temperature above 70° C. to effect precipitation. In carrying out this type of operation, the liquor may be maintained at a temperature above 70° C. for any suitable period of time. Temperatures above 70° C. may be employed primarily, or substantially solely, for precipitation purposes, or for the combined purpose of effecting precipitation and effecting further elimination of water. In producing ferrous sulphate mono-hydrate, I may also heat the liquor to a temperature at which ferrous sulphate mono-hydrate will precipitate, without effecting any substantial elemination of water at a lower temperature, and maintain it at such a temperature to effect elimination of water and precipitation of ferrous sulphate mono-hydrate. Any suitable temperature may be employed for the precipitation of ferrous sulphate mono-hydrate, but I prefer to employ a temperature of about 70° C. to 90° C. Additional or fresh unconcentrated liquor in suitable amounts may be added to the liquor being concentrated, or from which water is being eliminated, continuously or intermittently.

According to the preferred method or process of my invention, as applied, for example, to the treatment of waste pickling liquor, waste pickling liquor is concentrated by heating to effect the removal of sufficient water to permit crystallization of copperas ($FeSO_4 \cdot 7H_2O$). The resulting solution is cooled to effect the crystallization of copperas, and the crystallized copperas is separated from the residual liquor which may be treated further for the recovery of additional iron sulphate. The separated copperas is preferably heated to effect the removal of six molecules of water of crystallization and produce a product substantially in the form of ferrous sulphate mono-hydrate ($FeSO_4 \cdot H_2O$). The heating of the copperas is preferably carried out under such conditions as to effect removal of water substantially as fast as it is liberated from the crystal structure.

Removal of water of crystallization from the copperas results in the production of an iron salt more highly concentrated with respect to iron and the sulphate radical and which, consequently, may be shipped more cheaply from its point of production to a point of use. The ferrous sulphate mono-hydrate may also be converted more easily than copperas to ferric sulphate when the production of ferric sulphate is desirable.

When ferric sulphate is to be produced, the ferrous sulphate mono-hydrate is treated with a suitable oxidizing agent such as sulphuric acid. Preferably, the ferrous sulphate mono-hydrate, which is usually in granular or lumpy form, is mixed intimately with sulphuric acid in suitable amount to effect conversion of the ferrous sulphate to ferric sulphate to the desired degree.

If the production of ferric-aluminum sulphate or a mixture of ferric sulphate and aluminum sulphate is desirable, a relatively cheap aluminum compound capable of reacting with sulphuric acid to form aluminum sulphate may be incorporated in the iron sulphate product undergoing treatment with sulphuric acid. According to the preferred method of my invention, bauxite is mixed with the ferrous sulphate mono-hydrate, and the resulting mixture is subjected to the action of sulphuric acid in a mechanical mixer capable of intimately mixing the materials contained therein.

Preferably, sulphuric acid is added to the ferrous sulphate or to the mixture of ferrous sulphate and aluminum compound in an amount just sufficient to provide sulphate radical in the amount required to form aluminum sulphate with all of the aluminum present, when an aluminum compound is mixed with the ferrous sulphate, or to convert the ferrous sulphate to ferric sulphate, or to accomplish both results, but any desired smaller or larger amount may be added. The aluminum compound may be employed in any suitable amount to establish any desired iron-aluminum ratio in the final product. A very desirable sewage treatment reagent may be produced by employing the aluminum compound and sulphuric acid in such amounts as to form a ferric sulphate-aluminum sulphate product containing iron and aluminum in the proportion of about one part of aluminum to about ten parts of iron, by weight.

The preferred apparatus of my invention comprises an evaporating tower through which a solution to be concentrated may be passed downwardly; means for bringing hot gases into direct contact with the solution in the evaporating tower; a cooling vessel, preferably in the form of a tower through which the hot concentrated solution may be passed downwardly; means for passing a cooling gas such as air at atmospheric temperature in direct contact with the hot concentrated solution in the cooling tower; a crystallizing vessel for receiving cooled concentrated solution from the cooling tower and in which crystallization and separation of the copperas ($FeSO_4 \cdot 7H_2O$) takes place; a dryer for the copperas crystals preferably in the form of an inclined rotary tube or kiln through which the copperas crystals may be passed slowly; and means for passing hot gases in direct contact with the copperas crystals during the course of their passage through the dryer. The apparatus may also be provided with means for returning the depleted mother liquor, after separation of the copperas crystals, to the evaporating tower for further treatment. For installations designed to produce ferric sulphate, or mixtures of iron sulphate and aluminum sulphate, or both, the apparatus may include a mechanical mixer capable of mixing the ferrous sulphate mono-hydrate intimately with a suitable oxidizing or sulphatizing reagent. The evaporating tower preferably has associated therewith means for circulating the solution undergoing concentration continuously, and the means for introducing hot gases into the evaporating tower are preferably so arranged that the hot gases and the solution flow through the tower concurrently.

The invention will be better understood from a consideration of the following description in conjunction with the accompanying drawing illustrating schematically an arrangement of apparatus of the invention which may be employed in carrying out the preferred method of my invention.

The apparatus illustrated in the drawing comprises an evaporating tower 10 which may be a hollow tower or a tower packed with corrosion-resisting material such as checker brick or coke or which may be otherwise designed to provide large surfaces of contact between solution and hot gases flowing therethrough. The evaporating tower shown in the drawing is a hollow cylindrical tower provided with a chemical tile lining. Solution to be concentrated is introduced into the upper portion of the evaporating tower 10 through a valved conduit 11 which communicates with a feed tank 12 and a spray head 9. Hot gases are introduced into the upper portion of the evaporating tower near the point of introduction of the solution by means of a conduit 13 which communicates with a source of hot gases such as a furnace 14. Moisture-laden hot gases are withdrawn from the lower portion of the evaporating tower through a manifold 15 surrounding the lower portion of the evaporating tower and communicating with the interior thereof through suitable tuyères or conduits (not shown) and through a conduit 16 having a fan 17 included therein. The conduit 16 conducts the gases from the manifold 15 to a stack 18 through which they are released to the atmosphere.

Concentrated solution is withdrawn from the lower portion of the evaporating tower through a conduit 20 having a pump 21 included therein. The conduit 20 communicates with the feed tank 12 and with a branch conduit 22 which communicates with a spray-head 23 in the upper portion of a cooling tower 24. The conduits 20 and 21 are provided with suitable valves for controlling and distributing the flow of solution passing therethrough.

The cooling tower 24 is a hollow shell suitably lined with corrosion resisting material. Solution to be cooled is sprayed in finely divided form into the upper portion of the tower through the spray 23 and passes downwardly through the tower against an upwardly rising current of air introduced at atmospheric temperature into the lower portion of the tower through a valved inlet conduit 25 and a distributing header 26. Moisture-laden air is expelled to the atmosphere through a valved outlet 27 at the top of the tower.

Cooled solution passes from the cooling tower 24 through a conduit 28 to a crystallizing vessel 30. The crystallizing vessel 30 is a trough having an inclined bottom wall and so arranged that cooled solution from the cooling tower enters a relatively deep end portion. A rotatable screw 31 is mounted within the crystallizing chamber and so arranged that during rotation it moves crystals formed in the crystallizing vessel in a direction away from the deep end portion and to the opposite or shallow end portion. Crystals delivered to the shallow end of the crystallizing vessel by the rotary screw 31 are discharged into a conduit or chute 32 which conducts them directly to the interior of a rotary dryer 33. If desired, means such, for example, as a positive drive conveyor or feeder may be provided for conveying crystals from the crystallizing vessel to the dryer. Depleted mother liquor, formed by crystallization of ferrous sulphate from the cooled solution is withdrawn from the deep end portion of the crystallizing vessel by means of a conduit 34 having a pump 35 included therein. The conduct 34 communicates with the feed tank 12 and permits the return of depleted mother liquor to the evaporating tower for further concentration. A by-pass 36 is provided in the conduit 34 ahead of the pump 35 to permit wasting of the depleted mother liquor, if desired. Suitable valves are provided in the conduits 34 and 36 to permit control of the flow of depleted mother liquor therethrough. The hot waste gases leaving the cooling tower through the conduit 27 may be passed in heat exchanging relationship with the depleted mother liquor to conserve heat and in order to raise the temperature of the depleted mother liquor and thereby prevent the crystallization of ferrous sulphate in the return conduits.

The rotary dryer 33 may be of any suitable construction and length which will permit effective elimination of water from the mass of crystals entering from the crystallizing vessel. Hot gases are introduced into direct contact with crystals entering the charging end of the dryer by means of a conduit 37 which communicates with a suitable source of hot gases such as a furnace 38. The discharge end portion of the rotary dryer is surrounded by a hood 40 from which a dried product is discharged through a chute 42. A by-pass chute 43 communicates with the chute 42. Suitable valves are provided in the chutes 42 and 43 to control the flow of dried material to a dried product storage receptacle 44 and to a mixer 45. Suitable storage receptacles 46 and 47, for reagents such as sulphuric acid and finely divided bauxite, are provided adjacent the mixer. Valved conduits 48 and 40 permit the introduction of reagents from the storage receptacles 46 and 47 into the mixer.

In employing apparatus of the type illustrated in the drawing for the treatment of waste pickling liquor, the liquor, containing say about 53 grams per liter of iron and 19 grams per liter of free sulphuric acid, is introduced into the feed tank 12 and flows through the conduit 11 into the upper portion of the evaporating tower 10. Hot gases are introduced from the furnace 14 by means of the conduit 13 into the upper portion of the evaporating tower and the liquor and gases flow downwardly concurrently. A portion of the liquor introduced into the upper portion of the evaporating tower 10 is sprayed into contact with the inner surface of the tower lining, forming a substantially continuous thin film of liquor flowing downwardly in contact with the hot gases and the hot inner surface of the lining. The heat contained in the gases and the mechanical action of the gases cause evaporation or elimination of water contained in the liquor, and the gases and resulting water vapor are withdrawn by the fan 17 and introduced into the stack 18 from where they are discharged into the atmosphere. Concentrated liquor is withdrawn by means of the pump 21 and conduit 20 and a portion is passed to the cooler 24 while another portion is returned to the feed tank 12 for re-delivery to the evaporating tower.

The process is preferably so controlled that the temperature within the evaporating tower is maintained below the boiling point of water. Hot gases at any suitable temperature may be employed, but, preferably, the rate of feed of liquor and the rate of admission of hot gases to the evaporating tower are so controlled that the concentrated liquor is collected in and discharged from the bottom portion of the tower at a temperature of about 60° C. to 70° C. The return of depleted mother liquor from the cooling tower and concentrated liquor from the bottom of the evaporating tower are preferably so controlled that the liquor is introduced into the evaporating tower at a temperature of about 40° C. to 50° C.

Concentrated liquor delivered to the cooling tower by means of the conduit 22 is cooled within the cooling tower to a temperature at which, upon standing, copperas will separate therefrom by crystallization. Normally, it is advisable to control concentration of the liquor so that effective separation of copperas by crystallization will take place when the concentrated liquor is cooled through a temperature range of about twenty or thirty centigrade degrees, say from about 60° C. or 70° C. to about 40° C. or 50° C.

Cooled liquor passes from the lower portion of the cooling tower to the crystallizing vessel in which copperas crystals are formed and separated from the accompanying mother liquor. The depleted mother liquor is preferably delivered by means of the pump 35 and conduit 34 from the crystallizing vessel to the feed tank 12 where it enters the evaporating tower with fresh waste pickling liquor and circulating concentrated liquor. Crystalline copperas is delivered by the rotary screw 31 from the crystallizing vessel 30 to the chute 32 which conducts it to the rotary dryer 33. Hot gases from the furnace 38 and copperas delivered to the dryer pass through the dryer concurrently. During the course of the passage of the copperas through the dryer, all water associated therewith except one molecule of H₂O per molecule of ferrous sulphate (FeSO₄) is eliminated, and a dry, granular or lumpy product consisting essentially of ferrous sulphate mono-hydrate (FeSO₄.H₂O) is discharged into the chute 42 at the discharge end of the dryer. The hot gases passing in contact with the copperas crystals effect liberation of water from the crystal structure and substantially immediate removal of the liberated water.

Any suitable temperature may be maintained in the dryer and any suitable time of treatment may be employed. I have obtained highly satisfactory results by maintaining a temperature of about 110° C. to 120° C. within the dryer and employing a drying period of about one hour to one and one-half hours from the time of entry of the copperas to the time of discharge of the ferrous sulphate mono-hydrate (FeSO₄.H₂O).

If ferrous sulphate mono-hydrate is the desired end product, the material from the dryer may be conducted through the chute 43 to the storage receptacle 44 for subsequent use or for packing for shipment.

If ferric sulphate or a mixture of ferric sulphate and aluminum sulphate is desired, the granular product from the dryer may be conducted directly through the chute 42 to the mixer 45 or the granular material may be first stored in the receptacle 44 and subsequently conveyed to the mixer.

The granular material from the dryer (consisting essentially of ferrous sulphate mono-hydrate (FeSO₄.H₂O)) is introduced into the mixer together with the desired amount of an oxidizing agent such as sulphuric acid, and together with an aluminum compound such as bauxite, if the production of aluminum sulphate is desired. The mixer preferably should be of such construction that its contents may be heated during the mixing operation. Mixing of the ferrous sulphate and aluminum compound and mixing of the ferrous sulphate or the ferrous sulphate and aluminum compound with the oxidizing agent may be carried out in separate pieces of apparatus of any suitable type, if desired.

The mixture is maintained in the mixer at a suitable temperature and for a suitable period of time to effect the conversion desired. Treatment of a mixture consisting of ferrous sulphate mono-hydrate and a quantity of sulphuric acid containing just sufficient sulphate radical to effect conversion of the ferrous sulphate completely to ferric sulphate for a period of about one and one-half hours at a temperature of about 200° C. produces satisfactory results. Similar temperatures and periods of treatment produce satisfactory results when the production of aluminum sulphate in the mixture is desired.

I claim:

1. Apparatus for use in the recovery of dissolved substances from aqueous solutions comprising an evaporating tower, means for passing a solution downwardly through the evaporating tower, means for passing hot gas through the evaporating tower in direct contact with solution passing downwardly therethrough to effect concentration of the solution, a cooling vessel, means for conducting concentrated solution from the evaporating tower to the cooling vessel, means for cooling concentrated solution within the cooling vessel to a temperature at which a substance in solution therein will crystallize and precipitate, a crystallizing vessel, means for conducting cooled solution from the cooling vessel to the crystallizing vessel, means including a conduit extending from the crystallizing vessel to the evaporating tower for returning depleted mother liquor from the crystallizing vessel to the evaporating tower for further concentration, a dryer, and means for conducting crystallized substance from the crystallizing vessel to the dryer.

2. Apparatus for use in the recovery of dissolved substances from aqueous solutions comprising an evaporating tower, means for passing a solution downwardly through the evaporating tower, means for passing hot gas through the evaporating tower in direct contact with solution passing downwardly therethrough to effect concentration of the solution, means including a conduit extending from the lower portion of the evaporating tower to the upper portion thereof for returning solution from the lower portion to the upper portion of the evaporating tower, a cooling vessel, means for conducting concentrated solution from the evaporating tower to the cooling vessel, means for cooling concentrated solution within the cooling vessel to a temperature at which a substance in solution therein will crystallize and precipitate, a crystallizing vessel, means including a conduit extending from the crystallizing vessel to the evaporating tower for conducting cooled solution from the cooling vessel to the crystallizing vessel, means for returning depleted mother liquor from the crystallizing vessel to the evaporating tower for further concentration, a dryer, and means for conducting crystallized substance from the crystallizing vessel to the dryer.

ELIAS ANTHON CAPPELEN SMITH.